L. DUNN.
PNEUMATIC TIRE.
APPLICATION FILED NOV. 17, 1911. RENEWED FEB. 9, 1914.
1,109,972.  
Patented Sept. 8, 1914.
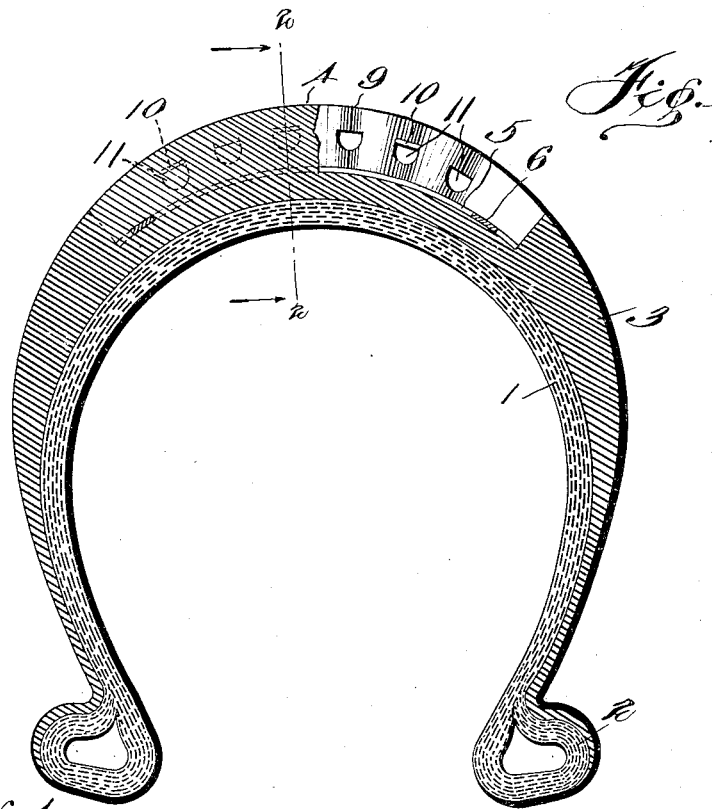
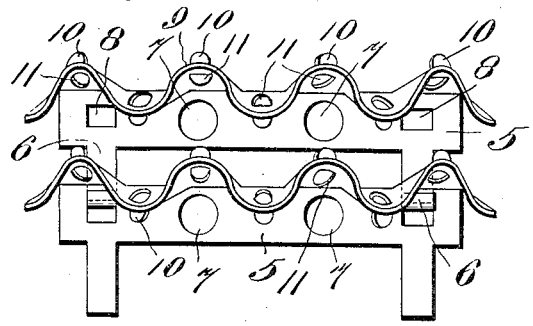
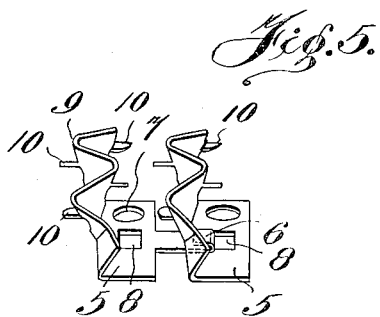
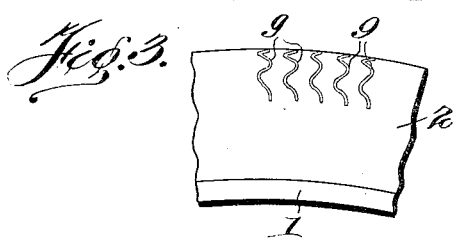
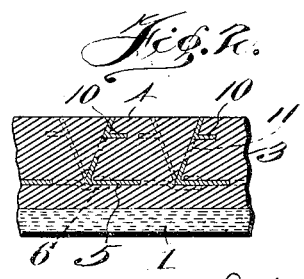
Witnesses  
M. Mar. Duvall  
H. H. Byrne
Inventor  
Leslie Dunn  
by Wilkinson, Fisher & Witherspoon  
Attorneys

UNITED STATES PATENT OFFICE.

LESLIE DUNN, OF NEW ORLEANS, LOUISIANA, ASSIGNOR TO HERCULES TIRE COMPANY, OF NEW ORLEANS, LOUISIANA, A CORPORATION OF LOUISIANA.

PNEUMATIC TIRE.

1,109,972. Specification of Letters Patent. Patented Sept. 8, 1914.

Application filed November 17, 1911, Serial No. 660,938. Renewed February 9, 1914. Serial No. 817,667.

*To all whom it may concern:*

Be it known that I, LESLIE DUNN, a citizen of the United States, residing at New Orleans, in the parish of Orleans and State of Louisiana, have invented certain new and useful Improvements in Pneumatic Tires; and I do hereby declare the following to be a full, clear, and exact description of the invention, such as will enable others skilled in the art to which it appertains to make and use the same.

My invention relates to improvements in pneumatic tires, and relates more especially in the art to which it appertains to make and tires.

It consists in providing in the tread of the tire a series of resilient, corrugated curved metal plates, adapted to be inclosed within a body of rubber, or other like resilient material, whereby the elasticity of the rubber is combined with the elasticity of the metal, and the non-wearing properties of the metal are secured, the result being an elastic tread, which will be in a large measure wear proof, and yet may be durable and yielding.

My invention will be understood by reference to the accompanying drawings, in which—

Figure 1 shows a section across an outer tire of the clencher type, constructed according to my invention. Fig. 2 shows a section along the line 2—2 of Fig. 1. Fig. 3 shows a fragmentary view of a portion of the tire as seen from the side, the corrugated metal plates being shown flush with the edge of the rubber. Fig. 4 shows a plan view, on a larger scale, of two of the links of the metal chain carrying the corrugated plates, which chain and plates are embedded in the rubber of the tread of the tire, and Fig. 5 shows a detail view in perspective, on a larger scale, of two of the metal links and corrugated plates shown in elevation in Fig. 3.

1 represents the base fabric of the tire, which may or may not be provided with the clencher heel 2.

3 represents the rubber outer coating, which is thicker at the tread 4, and in said tread a series of metal links 5 are embedded, hinged together as at 6 and perforated as at 7 and 8. These links 5 are integral with the outwardly turned corrugated plates 9, from which are punched out the projecting lugs 10. These links 5, and the outwardly turned corrugated plates and lugs, are all embedded in the rubber tread of the tire, and the rubber engages in the openings 7 and 8 and in the openings 11 formed by punching out the lugs 10, so that I provide a composite shoe composed of rubber, with corrugated resilient metal plates embedded therein, the rubber and the plates being firmly connected together by means of the rubber passing through the openings in the plates, and by means of the lugs 10 engaging in the rubber.

In operation, the wear on the tread is distributed over the resilient corrugated plates and the rubber face, and a highly resilient and substantially indestructible armored shoe is obtained.

Instead of using a tire of the clencher type, as shown, it will be obvious that the device may be applied to any other well known type of tires, the mode of fastening the tire to the rim having nothing to do with my invention.

It will be obvious that various modifications might be made in the herein described apparatus, which could be used without departing from the spirit of my invention.

Having thus described my invention, what I claim and desire to secure by Letters Patent of the United States is:—

A pneumatic tire having a rubber shoe portion with an endless chain of peripherally-spaced links embedded therein, said several links comprising perforated base plates provided with spacing lugs, pivotal connections between said several lugs and the adjacent plates of said endless chain, and radial webs flanged along straight lines across said plates, said webs being provided with corrugations extending from such base straight lines past both sides of said pivotal connections.

In testimony whereof, I affix my signature, in presence of two witnesses.

LESLIE DUNN.

Witnesses:
WALTER J. MANION,
J. W. LOWRY.